United States Patent
Hines et al.

(10) Patent No.: US 7,266,663 B2
(45) Date of Patent: Sep. 4, 2007

(54) AUTOMATIC CACHE ACTIVATION AND DEACTIVATION FOR POWER REDUCTION

(75) Inventors: Jeffery S. Hines, Wake Forest, NC (US); Clark D. Jeffries, Chapel Hill, NC (US); Minh H. Tong, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 11/034,617

(22) Filed: Jan. 13, 2005

(65) Prior Publication Data

US 2006/0156048 A1   Jul. 13, 2006

(51) Int. Cl.
G06F 12/00 (2006.01)
G06F 13/00 (2006.01)
G06F 13/28 (2006.01)

(52) U.S. Cl. .................. 711/170; 711/118; 713/320
(58) Field of Classification Search ................ 713/320; 711/170
See application file for complete search history.

(56) References Cited

U.S. PATENT DOCUMENTS

| | | | |
|---|---|---|---|
| 5,668,987 A | 9/1997 | Schneider | 395/603 |
| 5,802,600 A | 9/1998 | Smith et al. | 711/173 |
| 5,963,975 A | 10/1999 | Boyle et al. | 711/147 |
| 6,493,810 B1 * | 12/2002 | Pang et al. | 711/170 |
| 6,604,174 B1 | 8/2003 | Dean et al. | 711/131 |
| 2002/0065992 A1 | 5/2002 | Chauvel et al. | 711/141 |

OTHER PUBLICATIONS

Se-Hyeung Yang, Michael D. Powell, Babak Falsafi, Kaushik Roy, and T.N. Vijaykumar "An Integrated Circuit/Architecture Approach to Reducing Leakage in Deep-Submicron High-Performance I-Caches" Proceedings on the Seventh International Symposium on High-Performance Computer Architecture, 2001, 11pp.*

An Integrated Circuit/Architecture Approach to Reducing Leakage in Deep-Submicron High-Performance I-Caches, Se-Hyun Yang et al, Proceedings of the Seventh International Symposium on High-Performance Computer Architecture (HPCA), 2001, 11 pp.

* cited by examiner

Primary Examiner—Donald Sparks
Assistant Examiner—Ryan Bertram
(74) Attorney, Agent, or Firm—Joscelyn G. Cockburn; James A. Lucas; Driggs, Hogg & Fry Co., LPA

(57) ABSTRACT

The amount of chip power that is consumed for cache storage size maintenance is optimized by the close monitoring and control of frequency of missed requests, and the proportion of frequently recurring items to all traffic items. The total number of hit slots is measured per interval of time and is compared to the theoretical value based on random distribution. If the missed rate is high, then the observed effect and value of increasing cache size are deduced by observing how this increase affects the distribution of hits on all cache slots. As the number of frequently hit items in proportion to the total traffic items increases, the benefits of increasing the cache size decreases.

16 Claims, 7 Drawing Sheets

AUTOMATIC CACHE ACTIVATION AND DEACTIVATION FOR POWER REDUCTION

FIELD OF THE INVENTION

This invention relates to a performance-based system for monitoring and regulating computer chip power consumption based upon cache size and performance evaluation.

BACKGROUND OF THE INVENTION

A major motivation driving continuing improvement in computer technology is the consumer demand for more speed and power. One of the major obstacles for increasing the speed of a computer is the speed at which data can be accessed from memory. Accordingly, there is a strong emphasis on improving memory access times. The use of cache memory has helped to overcome this obstacle by providing a small amount of very fast memory that is used to store a copy of frequently accessed information. This cache memory is used along with the much larger but slower main memory. When a processor requests data from main memory, and the memory resides in the cache, then a cache 'read' hit occurs, and the data from the cache can be quickly returned to the processor. If the data is not in the cache, then a cache 'miss' is indicated, whereupon the data is retrieved from the main memory.

At the same time that increased memory retrieval speed is sought, it is desirable to reduce chip power consumption, provided it does not significantly reduce performance. As one approach to reduction of chip power consumption, the cache resources of a chip may be partly or completely put on standby (partially or completely powered down) as programs run. The choice can be dynamic and revised as programs run (dynamically and automatically).

A simple optimizing policy for cache size is defined as follows. All measurements are taken over a fixed interval Dt (which could be a time interval, cycle count or item count). The miss rate M is the number of workload events over Dt in which an item sought in the cache is not located and so had to be found in main memory. Depending upon cache storage policy, an item not found in the cache might or might not be added to the cache. The cache size C is fixed over each Dt but can be adjusted every Dt. If the miss rate M is below a threshold, then the cache size C is decreased. Otherwise, the cache size C is increased.

However, the workload may include in principle only one-time items (items seen once and then for all practical purposes never again). In this extreme case, caching has no performance benefit. Following this cache sizing policy with such a workload will result in no performance benefit but instead will cause eventual selection of maximum possible cache size with highest possible power consumption.

A method called Dynamically Resizable i-Cache (DRI) was proposed by Se-Hyun Yang et al. This approach is described in "Proceedings of the Seventh International Symposium on High-Performance Computer Architecture, 2001. The DRI increases or decreases the memory allocated to cached instructions using a comparison of current miss rate M with a predetermined target miss rate value. A mask shift by one bit is used on the memory index field, so that the memory change is always by a positive or negative power of two. The number of bits used to index to a cache slot (logically a variable equivalent to cache size) is denoted N. Thus, the amount of memory is doubled or halved with every change. According to Yang et al, the opportunity for changing N might be typically one every one million instructions.

The DRI method compares M to a target miss rate value. The size of the cache C is $2^N$ (2 raised to the power N) instructions. If the observed miss rate M is too high, then N is increased. If M is too low, then N is decreased. The simplest policy for cache consistency is that the cache is flushed every time N is changed, but more sophisticated approaches are described by Yang et al. There are many details that would be implementation-dependent, such as defining threshold miss rate values as well as a time interval over which to take the observed miss rate measurement. In fact, the DRI method apparently must find by trial and error an optimal cache miss rate threshold for any given benchmark. Then, as the benchmark is run, the memory changes are made in an effort to stay near the target miss rate.

According to work reported by Se-Hyun Yang at the SDI/LCS Seminar Series at Carnegie Mellon on Jan. 18, 2001, "Simulations using the SPEC95 benchmarks show that a 64 K DRI reduces, on average, both the leakage energy-delay product and average size by 62%, with less than 4% impact on execution time." This is a very good result, but it comes at the expense of tuning the target miss rate on a benchmark-by-benchmark basis.

To improve DRI, others have proposed methods that turn individual lines of cache memory on and off. Line-by-line adjustment avoids purging the entire cache as the size changes, but is more complex to design and fabricate. For example, S. Kaxiras et al. in IEEE Workshop on Power Aware Computer Systems Nov. 2000 proposed turning lines off if they have not been used for a number of cycles. However, for each benchmark, the optimal number of cycles (called a "decay time") to wait before turning off an unused line must be found by trial and error. The optimal delay for a benchmark called "jpeg" is about 13*1024 cycles (* denotes multiplication) and the optimal delay for a benchmark called "li" is about 97*1024 cycles. Furthermore, even within one application, different time delays are optimal at different times. Note that the optimal delay time for the extreme case, in which all items are one-time items, is zero cycles.

As reported in the Proceedings of $28^{th}$ International Symposium on Computer Architecture (ISCA) Jun. 2001 Pages 240-251, subsequent work by Kaxiras et al notes that when an item is initially cached, it can be expected to be referenced many times in the short-term, then lapse into a period of nonuse. An adaptive method with multiple levels of cache hierarchy and "inclusion bits" indicating the presence of a cache line in a higher level are proposed. Again, this design is more complex to design and fabricate than DRI.

Another line-by-line approach is Adaptive Mode Control (AMC) by H. Zhou et al. recorded in MAC Transactions on Embedded Computing Systems. Vol.2, No, 3. August 2003, pages 347-372. AMC regards cache lines as having tag and data parts. AMC applies to both instruction and data caching, according to the authors. AMC keeps all tag lines "awake" all the time and only dynamically adjusts the number of awake data lines. Keeping the tag lines awake enables an ongoing measurement of how many misses are "ideal misses" (misses that would occur even if the entire cache were fully on) and "sleep misses" (misses that occur due to some data lines being asleep). AMC compares the number of all misses with a "performance factor" multiplied by the number of ideal misses. A feedback mechanism increases the delay time of a line if the number of misses is >150% of a "performance factor" (>1) multiplied by the number of ideal misses. It decreases the delay time if the number of misses is <50% of this same factor. The performance factor is set at a configuration according to the desired balance between performance degradation and static power savings. Complexity of implementation is again an issue.

If traffic is in the extreme case that all items are one time the performance factor, then caching has no benefit. If in addition the miss rate is above the threshold for cache size adjustment, then the cache size in DRI or the number of active lines in the other instances of prior art will increase, ultimately to the maximum possible. This will not benefit performance but will cause worst-case power consumption.

In particular, DRI is the simplest method of the three methods described above, but it can power up the entire cache resource when actually the ideal answer is to turn the cache completely off (the extreme case of all one-time traffic with a positive target miss rate).

When an item arrives for lookup, a hash function is applied to its label. The hash function may be simple (selection of some label bits) or complex (a mathematical function applied to some or all label bits). The value of the hash function is an index into the active cache memory. The index derived from an item may point to a memory location with zero, exactly one, or more than one stored (cached) memory. If the memory location has zero memories, then there is a miss and the lookup must be performed in main memory. The item might or might not be entered into the cache, depending upon cache policy. If there is exactly one stored memory, then the cache points to the one stored memory. The full label of the item is then compared to a stored value. If there is a match, then the action stored with the memory is applied. If there is not a match, then there is a miss and the item must be sought in main memory. Meanwhile, the cache memory might or might not be updated to store the missed item, depending upon cache policy. If there are two or more memories with the hit cache index, then the fill label of the item may be used in a Patricia tree (see D. Knuth, *The Art of Computer Programming*, Addison-Wesley, Reading Mass., 2nd ed, 1998, Vol. 3, p 498). The Patricia tree tests label bits until, at most, one stored memory might fit the item. The full item label is then compared with the stored memory. If there is a match, then the stored action is applied. If there is not a match, then the item must be sought in main memory. The cache might or might not be updated to include the item, depending upon cache policy.

If there are few or no Frequent Flyers (items that occur frequently in the traffic stream), then rates at which slots (index values) are hit by hash values in the cache are typically random. With more than 1 K (=$2^{10}$) possible items and more than 1 K slots, it is unlikely that the hit rate on any one slot will differ greatly from the average=total number of items/number of slots. For example, if there are 1 K items over an interval Dt and 1 K slots, then the probability that a randomly selected item is in a slot hit by a total of at least eight items is only about 0.001. If there are 1 M (=$2^{20}$) items and 1 M slots, then the probability that a randomly selected item is in a slot hit by a total of at least 10 items is about one in a million or 0.000001. However, if there are Frequent Flyers among the items, then they may occur at much higher rates, resulting in much higher hit counts for precisely the slots hit by Frequent Flyers. That is, with a too large cache, the hit rates of index values are highly skewed (a few are hit many times, most are hit seldom or not at all).

If there are S slots and X items and if items are mapped at random to slots, then the expected number Sk of slots with exactly k items is $$Sk = S*C_{X,k}*(1/S)^k*(1-1/S)^{(X-k)} = C_{X,k}*(1/S)^{(k-1)}*(1-1/S)^{(X-k)}$$

Here, $C_{X,k}$=factorial(X)/(factorial(X-k)*factorial(k)).

Lookup Mechanisms

For main memory, the prior art typically includes lookup by means of Direct Table and Patricia Tree searches. The key is hashed to N bits (perhaps by just using the first N bits of the full key or by a nontrivial hash function). Each N-bit value is an index into a Direct Table (DT). The number S of slots is thus $2^N$. Each occupied slot in the DT contains no memories, exactly one memory, or points to a Patricia tree in which two or more memories are stored as leaves. At the leaf of the Patricia tree, the full key must be compared to a stored copy of the full key. If there is a match, then the slot points to the data needed for the item. If there is not a match, then a miss is declared and a leaf is added to the Patricia tree by well-known methods of prior art.

As previously noted, a cache is a set of items that are stored in a memory that typically is much smaller and faster than main memory. A key can be first or simultaneously sought in cache memory. Full comparison with key values is needed for a match, but an intermediate step might be a hash function. Numerous cache policies are possible for selecting which items to store in the cache.

The typical behavior of prior art cache sizing is shown on the charts represented by FIGS. 1 and 2. For example, this can be the above Automatic Cache Sizing algorithm with the variable skew locked at 0 (so never detecting skewness). In these two charts, the number of Frequent Flyers is constantly 512 ($2^9$) and their Proportion in all traffic is constantly 0.5. The value of Workload is initially 256 ($2^8$) per Dt (for 100 time steps), then 8192 or $2^{13}$ (for 200 time steps), then 1024 or $2^{10}$ (for 300 time steps), then 16384 or $2^{14}$ (for 100 time steps), then 1024 (for 300 time steps). The value of $M_{max}$ is 4000. For cache limits, $C_{min}=2^8$ and $C_{max}=2^{10}$.

Cache use for this sequence is as follows: Initially, the cache is not needed, then even the full cache cannot quite keep M below 4000 (even with full cache M is about 4096) then it is not needed, then it is needed again but cannot keep M below 4000 (even with full cache M is about 8193). The value of DecProb is $\frac{1}{32}$.

FIGS. 1 and 2 are representative of prior art in the sense that $M>M_{max}$ triggers cache size increase, whether or not that is actually beneficial. In fact, in FIG. 1, the use of the full cache wastes power and does not confer any performance benefit.

The same system with skew enabled is modeled in FIG. 2. The model uses the number FF of Frequent Flyers, the Proportion (Prop) of Frequent Flyers, the Workload (W), and the size of the Cache C to mathematically determine whether or not the hit distribution would be skew (skew=1). The rule used is Skew=one (1)if FF+(1−Prop)*W<0.5*C. Otherwise, skew=0

An approach to cache sizing and performance evaluation is described in U.S. Pat. No. 6,493,810. The concept of "adequate performance" in this patent apparently is predicated on some predetermined formula or analysis. The patent would appear to use an a priori definition of performance on which it determines that performance is low, and increases cache size based on that determination. In particular, the patent estimates cache-miss rates for average user and frequent user. Then it uses an "evaluation of performance impact of disk I/O rate," which appears to be an analytic estimate of performance based on theoretical miss rates. However, this determination fails to acknowledge whether or not a recent increase in cache size did or did not actually result in improved performance.

SUMMARY OF THE PRESENT INVENTION

An object of the present invention is to overcome the shortcomings of the prior art approaches to cache power utilization without reference to any specific cache policy.

The present invention can be more easily understood by reference to four extreme cases. The items that recur over a certain large number of Dt intervals are called Frequent Flyers. The ratio of Frequent Flyers to all traffic items in such a sample can be called the Proportion. Both values can be high or low, thereby leading to the four extremes:

1—Many Frequent Flyers and a high Proportion of Frequent Flyers among all traffic;

2—Many Frequent Flyers and a low Proportion of Frequent Flyers among all traffic;

3—Few Frequent Flyers and a high Proportion of Frequent Flyers among all traffic; and 4—Few Frequent Flyers and a low Proportion of Frequent Flyers among all traffic.

Considering the complexity and tuning issues of the prior art and the apparent lack of consideration of the above four extremes, the present invention provides a simple, automatic method that correctly responds to all traffic. The invention is not based on theoretical miss rates, but instead on reconfiguring of cache size dependent on a periodically computed sum of hit slots in a hash table.

In general terms, the present invention invokes the following policy:

1. The minimum possible cache size is $C_{min}$. The maximum size is $C_{max}$. Thus, $0 <= C_{min} <= C(t) <= C_{max}$. Also, $C_{min} < C_{max}$. The cache size C is the log base 2 of the memory size of the cache. Hence, adding 1 to C results in a doubling of the number of memory locations in the cache.

2. If the miss rate M is below a threshold, then the cache size C is decreased.

3. Otherwise, increasing the cache size in the previous Dt interval is accompanied by a decrease in the miss rate M and then the cache size continues to increase.

4. If increasing the cache size in the previous Dt interval is not accompanied by a decrease in the miss rate M, then the cache size is decreased.

The present invention consists of a new approach to Automatic Cache Sizing that has advantages over the above prior art. Embodiments of the invention apply to either instruction caching or to data caching. Cache size C is the log base 2 of the memory size of the cache. Hence, adding 1 to C results in the doubling of the number of memory locations in the cache.

The prior art taught the strategy of increasing the cache size if the rate M of references to main memory is high. However, in such circumstance, there can also be few Frequent Flyers. If so, then the benefit of increasing cache size can be small or zero, yet there is a cost, namely, increased power consumption. The present invention considers not only the miss rate but also the observed effect and value of increasing cache size when the miss rate is high. This value is deduced by observing a skew or nonskew distribution of hits on all cache slots. That is, the number of Frequent Flyers and their Proportion cannot be readily and directly found. Rather, indirect information (skewness) can be used.

A computer system comprises a processor, a memory, and storage including cache storage. The system which utilizes a method of conserving computer chip power consumption in the system comprises dynamically adjusting the size (C) of cache storage depending on both the frequency of missed requests (M) and the ratio of frequently accessed data records to all requests for access to said cache during an incremental unit (Dt). The incremental unit Dt can be a unit of time, cycles, instructions or other appropriate criterion. The cache size is updated for each unit of Dt. The method includes the step of selecting a value against which the frequency of missed requests M per Dt is compared, and the further step of predetermining an acceptable ratio of frequently accessed data records in a cache to all requests for access to said cache. This ratio typically is based on experience with benchmarks. The cache size is adjusted if necessary during each incremental value that is used for determining the ratio of frequently accessed data records to total data requests.

The invention also relates to a computer usable medium, such as a floppy disc having a computer readable program embodied in said medium. The program, when executed on a computer, causes the computer to perform the following steps:

maintain cache storage having a plurality of storage locations;

determine the number of missed requests during a given incremental value;

determine the number of frequently accessed records during the same incremental value;

determine the ratio of frequency accessed data records to all requests for access to cache storage; and determine cache size depending on said ratio.

The invention also relates to a sizing algorithm for determining optimum cache size (C) of each incremental unit (Dt). The size depends on the frequency of missed access requests (M(t)) and the ratio of frequently accessed data records to all access requests during said incremental unit. Cache size is increased only if the algorithm determines that an increase will result in an increase in performance. Otherwise, the cache size will remain unchanged or will be reduced. The incremental unit (Dt) typically is a time interval, but can also be a cycle count or item count or other criterion. The size of the cache is determined during each unit of time by using a suitable algorithm, such as probability theory to calculate skew distribution (S) of requests to all memory locations in a cache, and comparing skew to a given skew threshold value. A reduction in cache size is indicated if the number of memory locations accessed during Dt is less than the product of the skew threshold times the total number of items sought, and an increase in cache size is indicated if the number of accessed memory locations is greater than the product of these two parameters.

BRIEF DESCRIPTION OF THE DRAWINGS

The present invention will now be described with specific reference to the drawings which are provided for illustrative purposes only, and not as a limitation thereof.

DETAILED DESCRIPTION OF THE INVENTION

Figure 9:
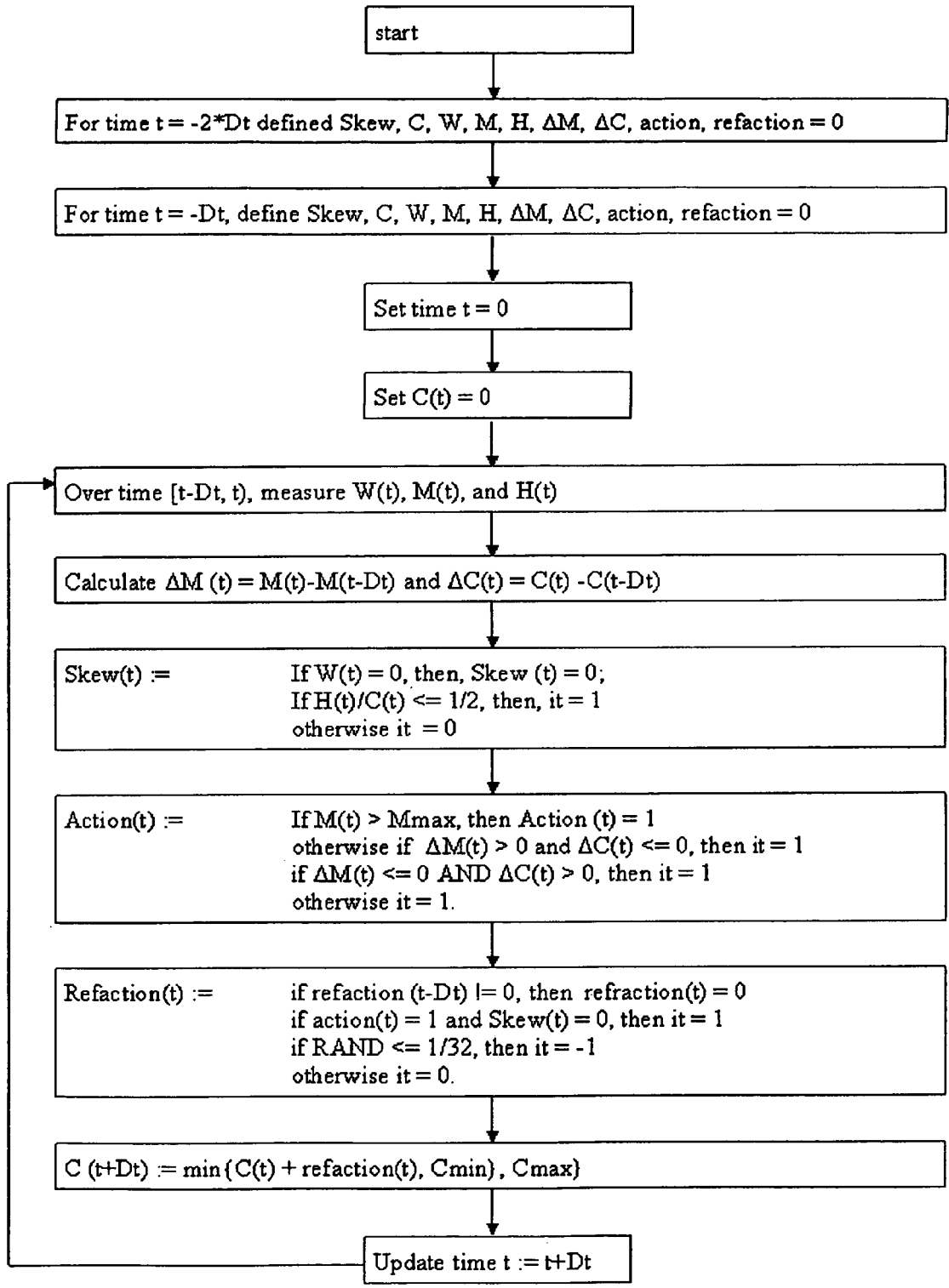
FIG. 9 is a process flow diagram of the present invention.
Figure 10C:
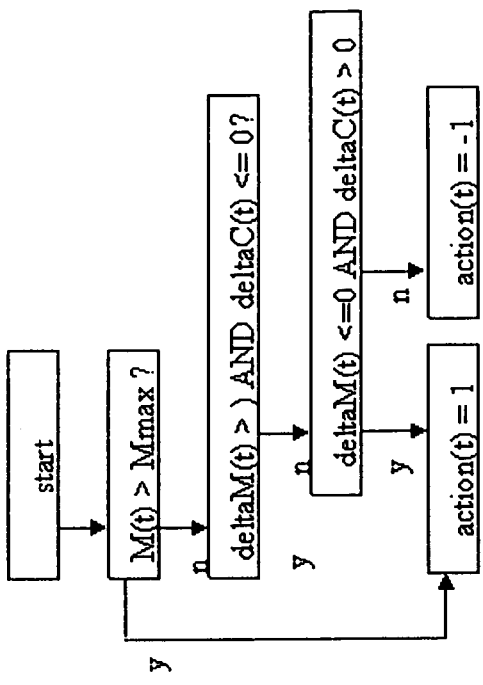
FIGS. 10a-10d are partial flow diagrams showing various subsets of the present invention.
Figure 10D:
Figure 10A:
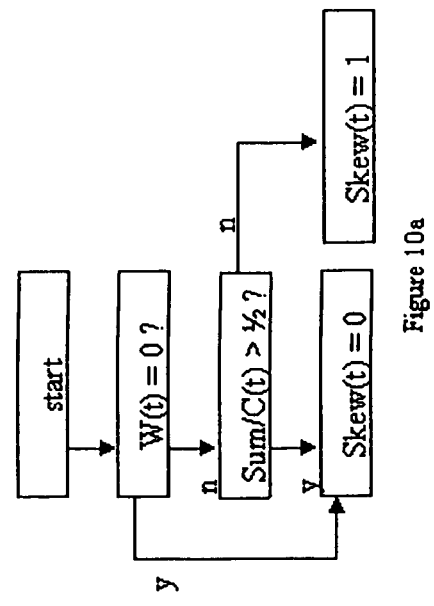
Figure 10B:
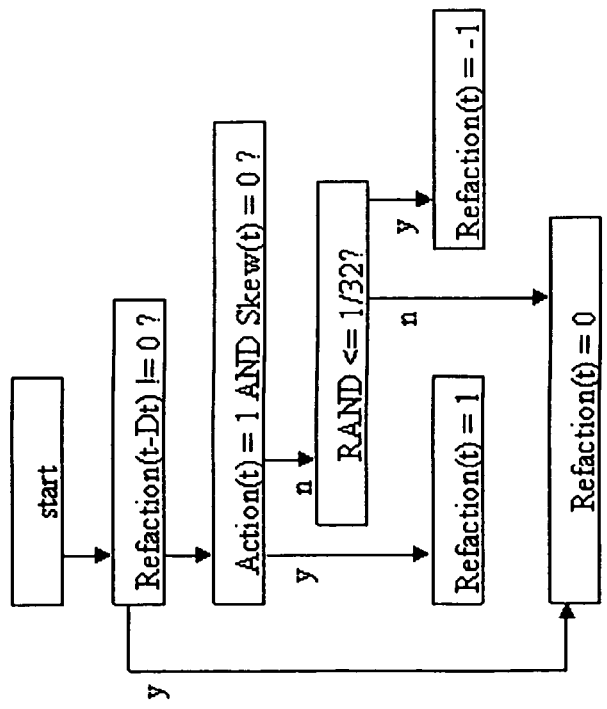

To facilitate the understanding of the present invention, the following terms are defined as system measurements and algorithm variables as follows:

System Measurements (Refer to the Process Flowsheet Shown in FIG. 9).

W(t) is the workload, representing the number of arriving references to memory over a given incremental value [t−Dt, t]. This incremental value is generally a time period but can also be a number of cycles or instructions;

M(t) are the number of references missed in the cache over this given interval;

S represents a slot;

H(t) is the number of hit slots in the cache over the same interval;

Algorithm Variables

Skew(t) is a variable representing the hit rates of index values representing the ratio of frequently hit values to values that are hit infrequently or not at all;

C(t) is cache size at a given interval;

ΔM(t)=M(t)−M(T−Dt);

ΔC(t)=C(t)−C(t−Dt);

Action(t) is a variable that will be used to incorporate the result of tests into a tentative action taken by the system; and Refaction(t) is a variable that will be used to incorporate the action into a refined action taken by the system. Both Action and Refaction are intermediate, mathematical variables that are only actually manifest in the subsequent update of the value of cache size. At times t=−2*Dt and −Dt, all of the algorithm variables are defined as 0.

An increment value for triggering measurement of variables is fixed and is denoted Dt. Dt can be in units of time, cycles, or instructions. Measurement times are t,t+Dt,t+2*Dt, and so on.

Cache size C is updated every Dt interval. The value C(t) is that held over the interval [t−Dt, t), the value C(t+Dt) is that held over the interval [t, t+Dt), and so on. For example, C(t+Dt) is computed instantaneously at times t.

Minimum and maximum values for cache size are specified with

0<=$C_{min}$<=C(t)<=$C_{max}$. Also $C_{min}$<$C_{max}$.

The Miss rate M(t) is the rate per Dt of references to main memory caused by cache misses. M(t) is deduced from data collected over the interval [t−Dt, t).

Performance Threshold $M_{max}$ is a target performance limit value for M.

Skew(t) is a binary signal representing the ratio of frequently accessed memory records to total number of records that are hit during an interval Dt such that skew(t)=1 if a few cache slots are hit many times and most cache slots are hit at the random distribution rate; otherwise, Skew(t)=0. Skew (t) is deduced from data collected over the interval [t−Dt, t).

ΔM(t)=M(t−Dt)−M(t−2*Dt)

ΔC(t)=C(t−Dt)−C(t−2*Dt).

Frequent Flyers are memory records that are accessed frequently.

S is the number of slots in a cache. Each slot contains an index value to a specific record in cache memory.

The present invention includes a one bit "hit indicator" for each slot. Each hit indicator is reset to 0 every Dt. During an interval Dt, when the slot is hit, the hit indicator is set to 1. If a slot (S) already has hit indicator=1 and is hit one or more additional times, the value of hit indicator remains 1.

At the end of interval Dt, the number of 1 hit indicators is summed or estimated.

If the hash results in random mapping of hits to slots, then the expected value of the sum of the hit indicators is a value 'Sum' defined as follows.

Sum=$S1+S2+S3+$

In the present invention, the maximum number of items (X) per Dt can be estimated. That estimated value plus a range of cache sizes can be considered. For example, suppose the number of slots (S)=1000, and the number of items (X)=1000. Assuming random item to index mapping, probability theory shows the expected numbers of slots Sk with exactly k items are as follows:

S1=377 S2=188 S3=63 S4=16 S5=3 S6=1 S7<1

Thus, Sum is approximately 648. So with a random hash of 1 K items into 1 K slots, the expected value of the Sum of hit indices would be 648.

Suppose, however, that all 1000 items comprised 100 distinct Frequent Flyers, each with a distinct hash value and each hit approximately ten times. Then the expected value of Sum would be about 100. Since 100<648, skewed distribution is indicated, that is, the cache size, holding 1 K values, could be decreased without high performance cost.

Next, suppose in all 1000 items there were only 10 distinct Frequent Flyers, each with a distinct hash value and each hit approximately 100 times. Then, the expected value of Sum would be 10. Since 10<<648, a highly skewed distribution is indicated.

Finally, suppose that a quarter of the 1000 items had random hashes and the rest were among 50 Frequent Flyers. Then the value of Sum would be about 50 (slots used by the 250 Frequent Flyers)+227 (slots used by the other 750 items assigned at random, based on probability, to 950 possible slots). The total is =277. Since 277<648, a somewhat skewed distribution is indicated.

In one embodiment, the binary value called 'Skew' is 1 if the number of hit slots is less than a threshold SkewThresh (with a value in [0, 1] such as 0.5) times the total number of items sought. Otherwise, Skew=0. That is, Skew(t)=Zero if Workload(t)=0;

Otherwise, it equals 1 if (Sum hit slots)/C(t)<=SkewThresh. Otherwise, it is 0.

If the Proportion is low, then the cache size is too big, regardless of the miss rate. In the extreme case that the Proportion is zero, then caching is of no benefit whatsoever. It follows then that if the periodic sum is very small or zero (regardless of miss rate), then the cache size should be decreased. The key is to detect a skewed distribution of hits.

Detection of a skewed distribution of hits can be achieved by counting the number of hit slots per Dt and comparing that total to the expected total appropriate for a random distribution. For example, suppose 2^20 items are processed during one Dt interval. The number 2^20 is equal to 1,048,576 (abbreviated 1M=1024K). Suppose the cache size were 2^20 slots. Suppose also there are 512 Frequent Flyers that occur 1024 times each, giving 512,000 Frequent Flyer items. The rest of the events each occur one-time. Hashed to a 1 M slot table, there would be 512 slots with an average 1 K hits each. The remaining 512,000 one-time items would go to about 412,000 (distinct) random slots (the number of occupied slots after randomly sending 512K items into about 1M slots from Probability Theory), so the total count of hit slots would be about 413,000. By contrast, for a random distribution, the expected total number of hit slots from 1 Mn items would be about 663,000 hit slots (based on Probability Theory). Since 413<663, such a low count (413,000) might be used to trigger reduction of the cache size C from an initial value of 1 M, regardless of the miss rate.

As an alternative, the number of slots hit repeatedly is recorded every Dt. If X items are mapped to S slots in time interval Dt, then a threshold such as 4*(X/S) might be used. If the number of slots with more than the threshold of hits is large (such as >=S/16), then the distribution could also be defined to be skewed with skew=1.

Automatic Sizing Algorithm

An Automatic Sizing Algorithm can be used to increase cache size if needed and is effective, or to decrease cache size.

In one embodiment, the Automatic Sizing Algorithm can be described as follows. The inputs of the Automatic Sizing Algorithm are the values Skew(t), C(t), M(t), $\Delta M(t)$, and $\Delta C(t)$. The outputs of the Automatic Sizing Algorithm are intermediate variables called Action(t) and Refaction(t) (from "refined action"), as well as the new value for C, namely, C(t+Dt). The intermediate variables Action(t) and Refaction(t) are computed instantaneously at times t.

An Automatic Cache Sizing Algorithm is triggered by a timer interrupt every increment Dt. For times $-2*Dt$ and $-Dt$ (the first two times), all the variables C, M, Skew, $\Delta M$, $\Delta C$, Action, and Refaction are defined to be zero. For times 0*Dt, 1*Dt, 2*Dt, 3*Dt, and so on, the variables are updated as follows.

M(t) is determined as the sum of Miss references over [t–Dt, t). Skew(t) is determined at time (t) by a sum of cache hit indicators over [t–Dt, t) or by the alternative method described above.

$\Delta M(t) = M(t) - M(t-Dt)$ $\Delta C(t) = C(t) - C(t-Dt)$

A probability of C decrease Actions is used and is called DecProb. It has some fixed accuracy (such as 15 binary bits) with a value in [0, 1). DecProb is typically 1/32. Also, a Random number RAND with some fixed accuracy (such as 15 binary bits) is used with value in [0, 1).

Action(t)=One (1) if $M(t)>M_{max}$; or if $\Delta M(t)>0$ and $\Delta C(t)<=0$, or if $\Delta M(t)<=0$ and $\Delta C(t)>0$; otherwise, it equals minus one (–1).

Refaction(t+Dt)=Zero (0) if Refaction(t–Dt)!=0; (note '!' means "not equal")

Refaction(t+Dt)=One (1) if Action(t)=1 and Skew(t)=0;

Refaction(t+Dt)=Minus one (–1) if RAND<=DecProb, Otherwise,

Refaction(t+Dt)=zero (0). $C(t+Dt)=\min\{\max(C(t)+\text{Refaction}(t), C_{min}\}, C_{max}\}$.

Figure 2:
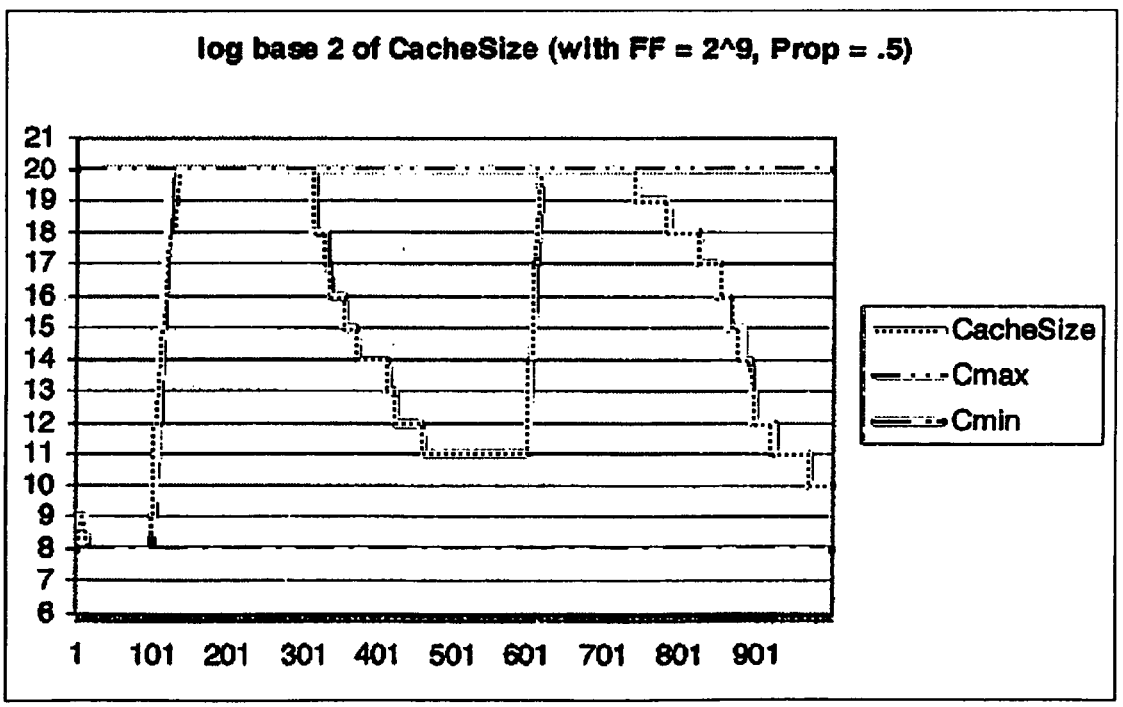
Figure 4:
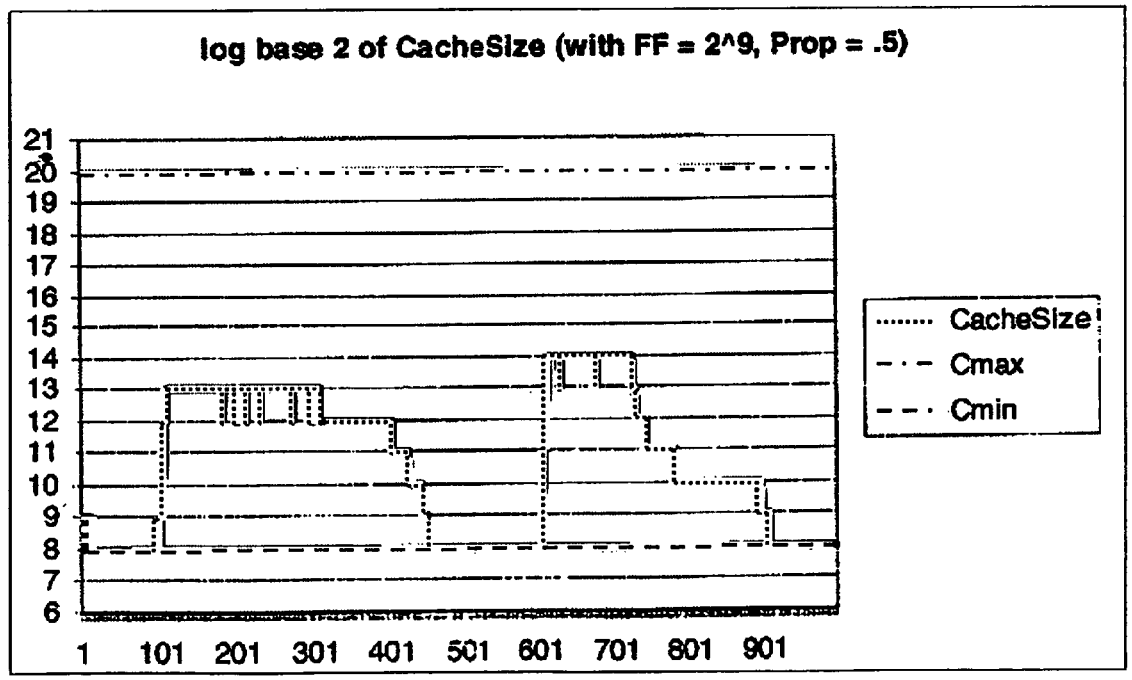

Note in FIGS. 2 and 4 that during low Workload (time steps 1 through 100), both prior art and the present invention determine that cache size $C_{min}$ is optimal.

The size of cache determined by the two systems during heavy Workloads is clearly different. During the Workload=8192 period (timesteps 101 through 300), the cache size is nominally chosen as 13 bits and the peak M is about 4159, somewhat above the target value of $M_{max}$=4000. However, even the full cache (prior art) cannot quite keep M below 4000 (with full cache of 2^20 entries, M is about 4096). If lower M is desired than 4159 at the expense of larger cache, then SkewThresh can be adjusted from 0.5 to a lower value, such as 0.05. Here are some representative results.

The following table provides a summary of prior art versus present invention comparison during high workload:

TABLE I

| Skew Thresh | Workload | Proportion | Mmax | Cache Size | M | Notes |
| --- | --- | --- | --- | --- | --- | --- |
| 1 | 8192 | .5 | 4000 | 2^8 | 5600 | Fixed, minimum cache size of 2^8, regardless of M versus $M_{max}$ |
| .5 | 8192 | .5 | 4000 | 2^13 | 4159 | Recommended response to Cache Hit Skewness |
| .05 | 8192 | .5 | 4000 | 2^14 | 4128 | Low response to Cache Hit Skewness |
| 0 | 8192 | .5 | 4000 | 2^20 | 4096 | Prior Art, no response to Cache Hit Skewness |

Figure 1:
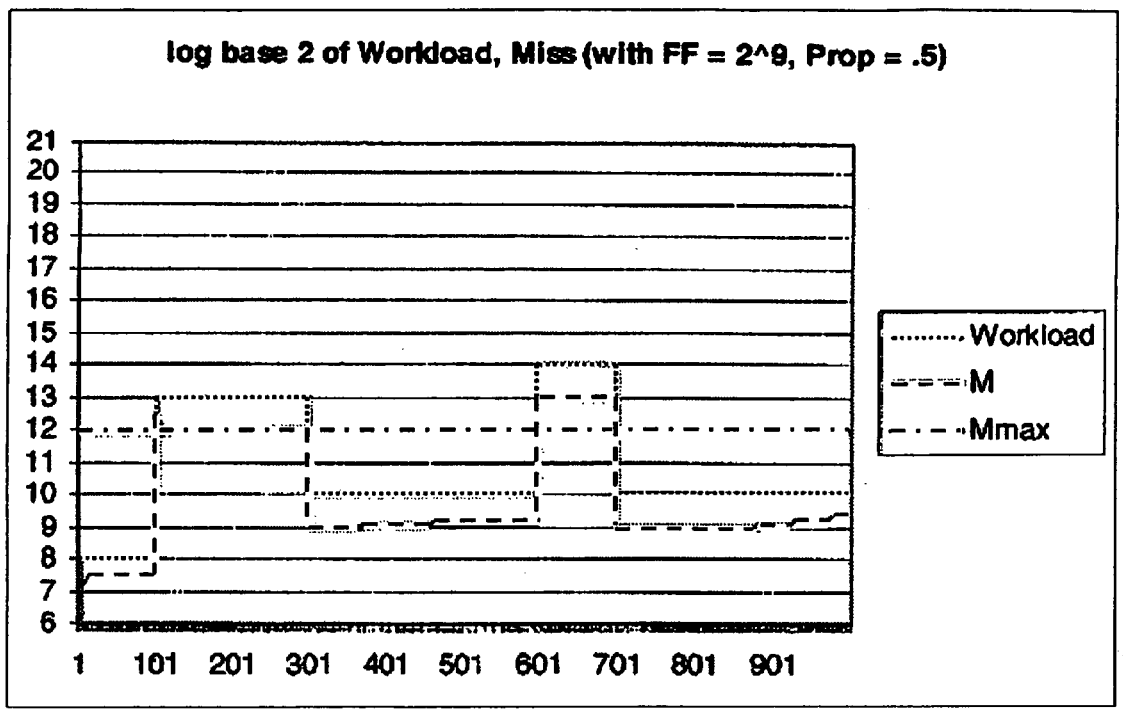
FIGS. 1 and 2 are representative graphs showing the prior art approach to management of cache power consumption.
Figure 3:
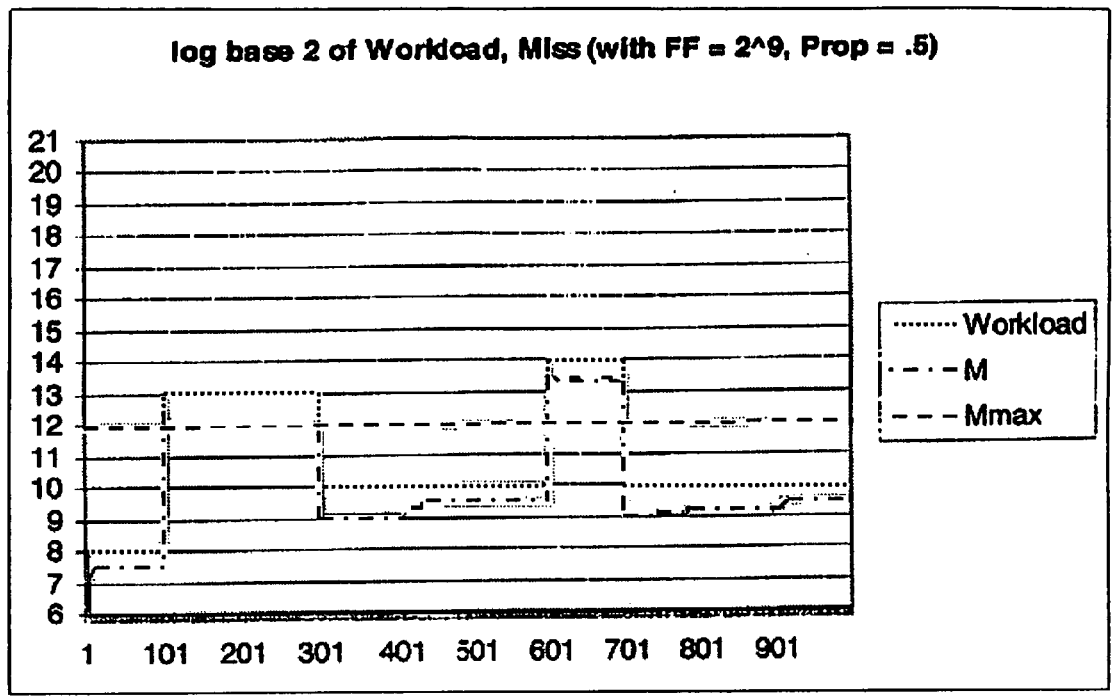
FIGS. 3 and 4 are graphs showing the power conservation according to the present invention.

As has been shown, in both systems, the target maximum miss rate value $M_{max}$ is sometimes exceeded. This is shown in FIGS. 1 and 3. For the prior art, the excess is 6614 versus target $M_{max}$=4000. For the present invention, as shown in FIGS. 2 and 4, the excess is 6614 versus target $M_{max}$=4000. The present invention determines that a cache of half the size (2^19 versus 2^20) achieves almost the same performance and so is a better choice. The present invention also reduces cache size twice as fast once the surge of heavy workload is over.

Figure 5:
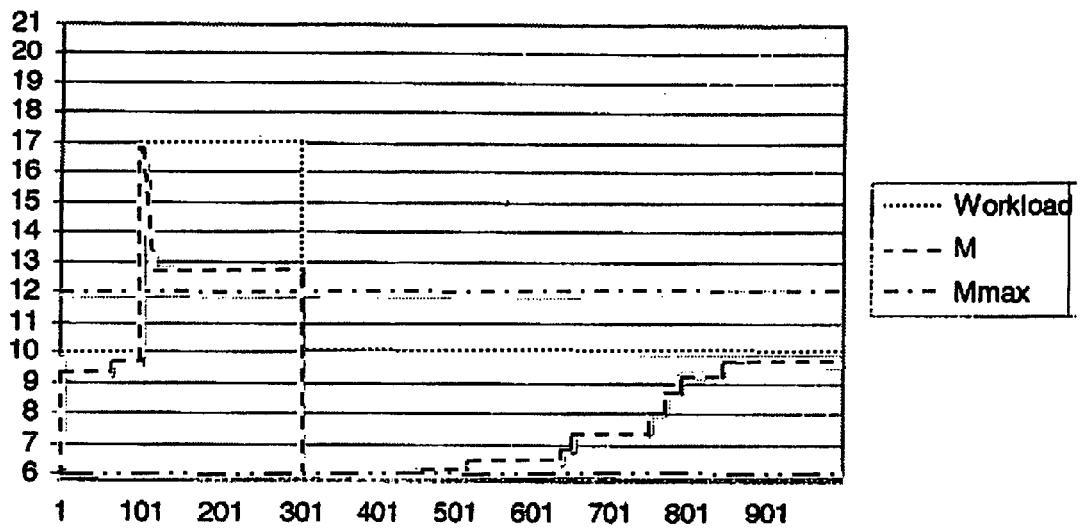
FIGS. 5 and 6 are two more graphs of the prior art showing power conservation for large cache requirements.
Figure 6:
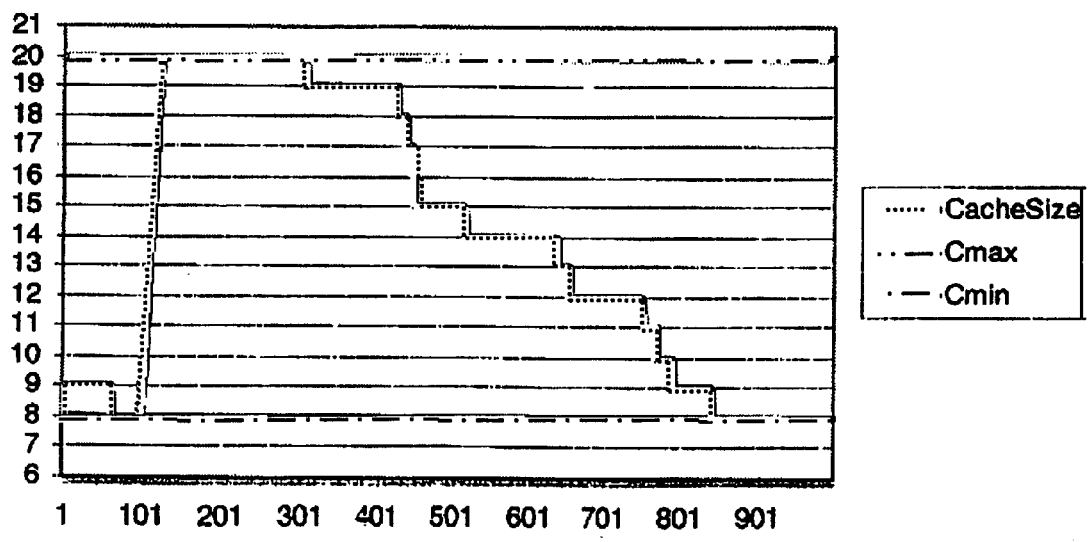
Figure 7:
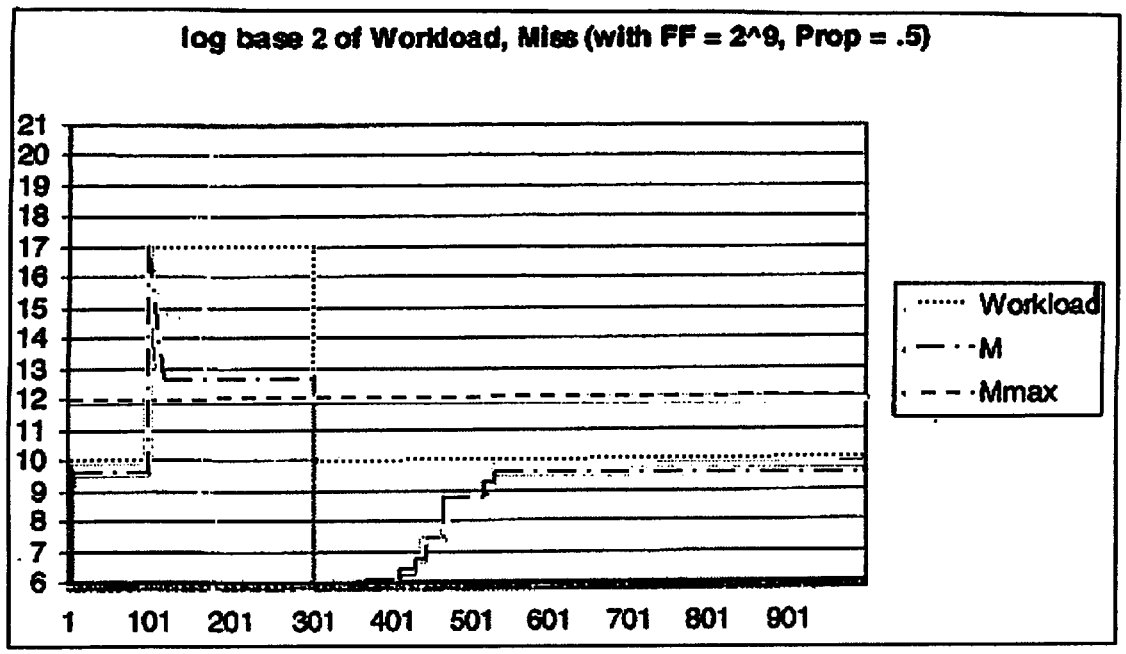
FIGS. 7 and 8 are comparative graphs of the present invention for large cache requirements.
Figure 8:
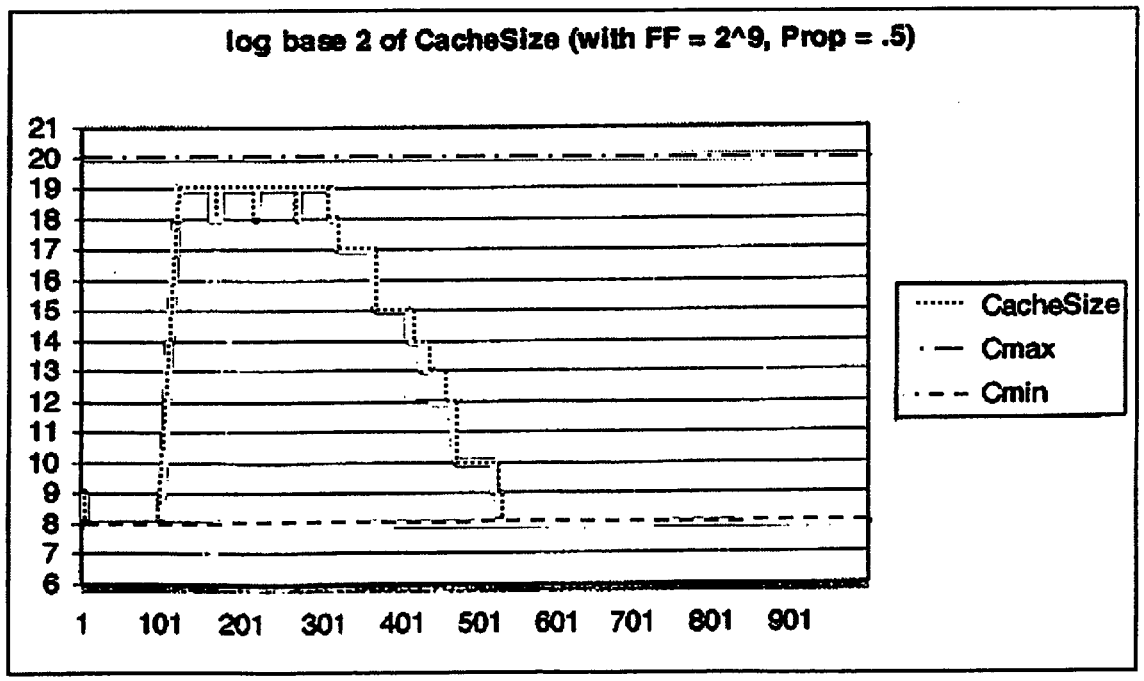

As another example, suppose a very large cache is actually needed and beneficial. Suppose further that the number of Frequent Flyers is 2^17 and the Proportion is 0.95. Also, let the workload equal 2^10 (time steps 1 through 100), then 2^17 (time steps 101 through 300) and, finally, 2^10 for the remainder of time steps. Also, suppose that $M_{max}$=4000. FIGS. 5 and 6 show the prior art approach to this scenario whereas FIGS. 7 and 8 represent the applications of the principles of the present invention. In both systems, the target value $M_{max}$ is exceeded. For the prior art, the excess is 6614 versus target $M_{max}$=4000. For the prior art, the excess is 6614 versus target $M_{max}$=4000. For the present invention, the excess is 6614 versus target $M_{max}$=4000. The present invention determines that a cache of half the size (2^19 versus 2^20) achieves almost the same performance and so is a better choice. The present invention also reduces cache size twice as fast once the surge of heavy workload is over.

In summary, during light workloads, the present invention determines that a minimum cache size is optimal. During high workloads, the present invention only increases cache size if the benefit to performance is actually significant. On the other hand, if the workload is very heavy, if the number of Frequent Flyers is high, and if the Proportion of Frequent Flyers is high (so a very large cache is optimal), then the present invention correctly determines that a very large cache is necessary and actually beneficial.

Figure 11:
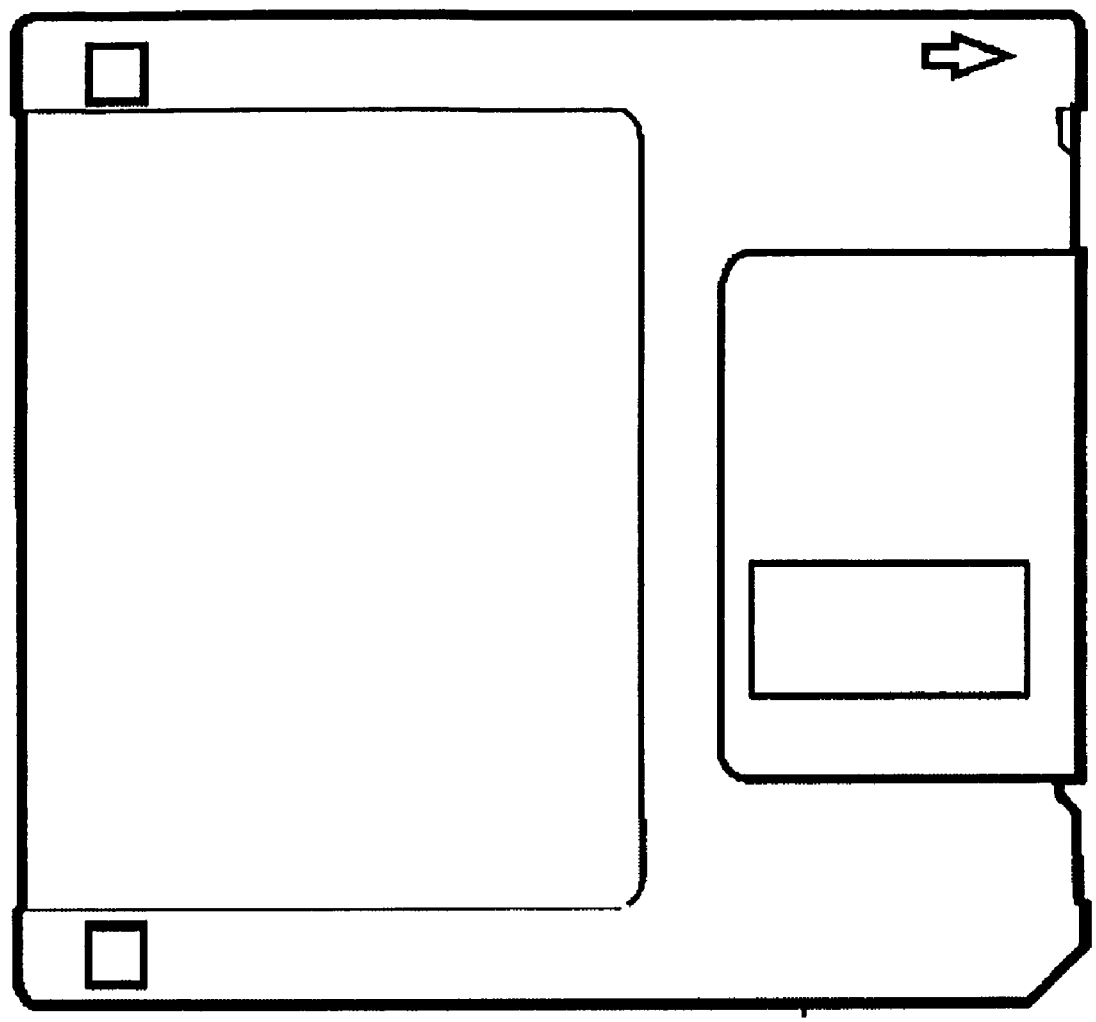
FIG. 11 shows a floppy disc, indicative of a computer-readable medium for carrying out the steps of the present invention.

FIG. 11 shows a computer-readable medium in the form of a floppy disc 110 for containing the software implementation of the program to carry out the various steps of cache management according to the present invention. Other machine readable storage mediums are fixed hard drives, optical discs, magnetic tapes, semiconductor memories, such as read-only memories (ROMs), programmable read-only memories (PROMs), etc. The article containing this computer readable code is utilized by executing the code directly from the storage device, or by copying the code from one storage device to another storage device, or by transmitting the code on a network for remote execution. The computer program may be loaded into the memory to configure and to run the program herein described and claimed for execution. The computer program comprises instructions which, when read and executed by the system, perform the steps necessary to execute the steps or elements of the present invention.

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program instructions or a computer program in the present context mean any expression, in any language, code (i.e., picocode instructions) or notation, of a set of instructions intended to cause a system having an information processing capability to perform a particular function either directly or after either or both of the following occur: (a) conversion to another language, code or notation; (b) reproduction in a different material form.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. In a computer system comprised of a processor, a memory, and storage including cache storage, the method of conserving computer chip power consumption comprising dynamically adjusting the size (C) of cache storage depending on both the frequency of missed requests (M) and the ratio of frequently accessed data records to all requests for access to said cache spanning an incremental unit Dt, said method of adjusting cache storage size uses an algorithm wherein said algorithm uses intermediate variables Action(t) and Refaction(t) wherein Action(t)=One (1) if $M(t)>M_{max}$; or if $\Delta M(t)>0$ and $\Delta C(t)<=0$, or if $\Delta M(t)<=0$ and $\Delta C(t)>0$; otherwise, Action(t) equals minus one (−1), Refaction(t+Dt)=Zero (0) if Refaction(t−Dt) does not=0;

Refaction(t+Dt)=One (1) if Action(t)=1 and Skew(t)=0;

Refaction(t+Dt)=Minus one (−1) if RAND<=DecProb, Otherwise, refaction(t+Dt)=zero (0); and a new value for cache size is computed as $C(t+Dt)=\min\{\max(C(t)+Refaction(t), C_{min}\}, C_{max}\}$.

2. In the computer system according to claim 1 wherein the method includes selecting said incremental unit Dt from the group consisting of time, cycles and instructions, and updating the cache size for each unit of Dt.

3. In the computer system according to claim 2 wherein the method includes the step of selecting a value against which the frequency of missed requests M per Dt is compared.

4. In the computer system according to claim 1, the method further including the step of predetermining an acceptable ratio of frequently accessed data records in a cache to all requests for access to said cache.

5. In the computer system according to claim 4, the step of predetermining the ratio is based on experience with benchmarks.

6. In the computer system according to claim 1, the method includes adjusting the cache size during each incremental value that is used for determining the ratio of frequently accessed data records to total data requests.

7. In the computer system according to claim 1 wherein cache storage size is increased if an increase results in an increase in the performance of the processor, and is not increased if an increase does not result in an increase in processor performance.

8. A system for reduction of cache power consumption of a processor, comprising means to dynamically adjust the size of a cache depending on both the frequency of missed requests and the ratio of frequently accessed data records to all requests for access to said cache, wherein the method of adjusting cache size uses an algorithm that utilizes intermediate variables Action(t) and Refaction(t)-, Action(t) incorporating the result of tests into a tentative action by the system, and Refaction(t) incorporating the results of tests into a refined action taken by the system, wherein Action(t)=One (1) if $M(t)>M_{max}$; or if $\Delta M(t)>0$ and $\Delta C(t)<=0$, or if $\Delta M(t)<=0$ and $\Delta C(t)>0$; otherwise, Action(t) equals minus one (−1);

Refaction(t+Dt)=Zero (0) if Refaction(t−Dt) does not=0;

Refaction(t+Dt)=One (1) if Action(t)=1 and Skew(t)=0;

Refaction(t+Dt)=Minus one (−1) if RAND<=DecProb, Otherwise, refaction(t+Dt)=zero (0); and a new value for cache size is computed as $C(t+Dt)=\min\{\max(C(t)+Refaction(t), C_{min}\}, C_{max}\}$.

9. A system for reduction of cache power consumption of a processor according to claim 8 further including means for selecting a value against which the frequency of missed requests is compared.

10. A system for reduction of cache power consumption of a processor according to claim 9 further including the selection of a threshold value as the selected value.

11. A system for reduction of cache power consumption of a processor according to claim 8 including the selection of a predetermined acceptable ratio of frequently accessed data records to all requests for access to a cache.

12. A system for reduction of cache power consumption of a processor according to claim 8 wherein the cache size during each incremental value is used for determining the ratio of total data requests to frequently accessed data records.

13. The system according to claim 12 wherein cache size is increased if an increase results in an increase in the performance of the processor, and is not increased if an increase does not result in an increase in processor performance.

14. A computer readable medium storing a sizing algorithm for determining optimum cache size (C) spanning each incremental unit (Dt) of time depending on the frequency of missed access requests (Mt) and the ratio of frequently accessed data records to all access requests during said incremental unit, wherein the size of the cache is determined during each unit of time by using probability theory to calculate Skew distribution (S) of requests to all memory locations in a cache, and comparing (S) to a given Skew threshold value.

15. The computer readable medium according to claim 14 wherein the sizing algorithm indicates a reduction in cache size if the number of memory locations accessed during Dt is less than the product of the Skew threshold times the total number of items sought, and indicates an increase in cache size if the number of accessed memory locations is greater than said product.

16. The computer readable medium according to claim 14 wherein said sizing algorithm uses intermediate variables Action(t) and Refaction(t) in which Action(t) One (1) if $M(t)>M_{max}$; or if $\Delta M(t)>0$ and $\Delta C(t)<=0$, or if $\Delta M(t)<=0$ and $\Delta C(t)>0$; otherwise, Action(t) equals minus one (−1);

Refaction(t+Dt)=Zero (0) if Refaction(t−Dt) !=0;

Refaction(t+Dt)=One (1) if Action(t)=1 and Skew(t)=0;

Refaction(t+Dt)=Minus one (−1) if RAND<=DecProb; otherwise, refaction(t+Dt)=zero (0); and a new value for cache size is determined as $C(t+Dt)=\min\{\max(C(t))+\text{Refaction}(t), C_{min}\}, C_{max}\}$.

* * * * *